US012649335B2

(12) United States Patent
Neau et al.

(10) Patent No.: US 12,649,335 B2
(45) Date of Patent: Jun. 9, 2026

(54) LOW-NOISE TIRE FOR A HEAVY GOODS VEHICLE

(71) Applicant: COMPAGNIE GENERALE DES ETABLISSEMENTS MICHELIN, Clermont-Ferrand (FR)

(72) Inventors: Xavier Neau, Clermont-Ferrand Cedex (FR); Michael Arnoux, Clermont-Ferrand Cedex (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 18/851,490

(22) PCT Filed: Mar. 23, 2023

(86) PCT No.: PCT/EP2023/057456
§ 371 (c)(1),
(2) Date: Sep. 26, 2024

(87) PCT Pub. No.: WO2023/186694
PCT Pub. Date: Oct. 5, 2023

(65) Prior Publication Data
US 2025/0206068 A1 Jun. 26, 2025

(30) Foreign Application Priority Data
Mar. 30, 2022 (FR) .................................. FR2202855

(51) Int. Cl.
*B60C 11/12* (2006.01)
*B60C 11/03* (2006.01)

(52) U.S. Cl.
CPC ...... *B60C 11/1204* (2013.01); *B60C 11/0323* (2013.01); *B60C 11/1259* (2013.01); *B60C 2011/0346* (2013.01); *B60C 2200/06* (2013.01)

(58) Field of Classification Search
CPC . B60C 11/12; B60C 11/1204; B60C 11/1236; B60C 11/13; B60C 11/1307;
(Continued)

(56) References Cited

U.S. PATENT DOCUMENTS

2004/0003879 A1* 1/2004 Radulescu .......... B60C 11/1218
152/209.28
2017/0174008 A1 6/2017 Marlier et al.
(Continued)

FOREIGN PATENT DOCUMENTS

EP 3344476 4/2020
FR 3099414 2/2021
(Continued)

*Primary Examiner* — Cedrick S Williams
(74) *Attorney, Agent, or Firm* — COZEN O'CONNOR

(57) ABSTRACT

A low-noise tire (1) for a heavy-duty vehicle, having a tread (2) having at least two juxtaposed complex circumferential cuts (41, 42) which are separated from one another by a circumferential row of raised elements (5). Each complex circumferential cut (41, 42) has an alternation of external cavities (61, 62), which are distributed at a circumferential pitch (Pc), and of internal cavities (71, 72). Pairs of raised elements (5) are separated by sipes (8), having two ends (I1, I2), and distributed at a circumferential pitch (Pi). The circumferential distance (Di) between the respective two ends (I1, I2) of any sipe (8) is equal to the circumferential pitch (Pi) of the sipes (8), and the circumferential pitch (Pc) of the external cavities (61, 62) is equal to the circumferential pitch (Pi) of the sipes (8).

10 Claims, 4 Drawing Sheets

(58) Field of Classification Search
CPC ... B60C 11/03; B60C 11/032; B60C 11/0323;
B60C 11/0327; B60C 2011/1213; B60C
2011/129; B60C 2011/0339; B60C
2011/0341; B60C 2200/065; B60C
2200/06
See application file for complete search history.

(56) References Cited

U.S. PATENT DOCUMENTS

| | | | | |
|---|---|---|---|---|
| 2020/0047560 | A1* | 2/2020 | Kouda | ................ B60C 11/1281 |
| 2020/0298625 | A1 | 9/2020 | Zhu et al. | |
| 2021/0347209 | A1 | 11/2021 | Djabour et al. | |

FOREIGN PATENT DOCUMENTS

| | | |
|---|---|---|
| WO | WO 2011/039194 | 9/2009 |
| WO | WO 2011/101495 | 8/2011 |
| WO | WO 2012/130735 | 10/2012 |
| WO | WO 2016/188956 | 12/2016 |
| WO | WO 2017/174925 | 10/2017 |
| WO | WO 2018/083414 | 5/2018 |
| WO | WO 2019/008276 | 1/2019 |
| WO | WO 2019/122677 | 6/2019 |

* cited by examiner

LOW-NOISE TIRE FOR A HEAVY GOODS VEHICLE

RELATED APPLICATIONS

This is a U.S. National Phase Application under 35 USC 371 of International Application PCT/EP2023/057456 filed on Mar. 23, 2023.

This application claims the priority of French application no. FR 2202855 filed Mar. 30, 2022, the entire content of all of which is hereby incorporated by reference.

FIELD OF THE INVENTION

The subject of the present invention is a tire for a heavy-duty vehicle and the invention relates to the tire tread, which more particularly comprises complex and evolving cuts, which is to say cuts the shape of which evolves as the tread gradually wears.

BACKGROUND OF THE INVENTION

A tread, consisting of at least one rubber-based material, is the peripheral part of the tire, intended to be worn when it comes into contact with the ground via a tread surface and to grip the ground. It generally comprises a tread pattern, consisting of cuts separating raised elements and therefore delimited by two walls of rubbery material.

By definition, the circumferential or longitudinal direction is the direction of rotation of the tire, the axial or transverse direction is the direction parallel to the axis of rotation of the tire and the radial direction is a direction perpendicular to the axis of rotation of the tire.

Any cut in the tread, having a mean line that is not necessarily rectilinear, that is to say one that may be undulating or zigzag, is circumferential, transverse or oblique. By definition, the mean line of a cut is the intersection between its mean surface, equidistant from the walls delimiting the cut, and the tread surface. By convention, a cut is said to be circumferential when its mean line has a substantially circumferential mean direction, that is to say one forming, with the circumferential direction, a mean angle of less than 30°. A cut is said to be transverse when its mean line has a substantially transverse mean direction, that is to say one forming, with the circumferential direction, a mean angle at least equal to 60°. A cut is said to be oblique when its mean line has a substantially oblique mean direction, that is to say forms, with the circumferential direction, a mean angle of between 30° and 60°.

As is known, the wet-weather running conditions of a vehicle, and more particularly those of a heavy-duty vehicle, require rapid evacuation of the water present in the contact patch in which the tread is in contact with the road surface. This evacuation makes it possible to ensure that the material constituting the tread comes into direct contact with this road surface via the tread surface. The water that is not pushed ahead of or to the sides of the tire flows or is collected partially in the cuts formed in the tread. The evacuation of the water is ensured by the cuts, which form a fluid flow network that needs to be effective throughout the service life of the tire, from new to its state of maximum wear. The state of maximum wear, which is set by the regulations in force, is the state of wear beyond which the tire needs to be removed from the vehicle for safety reasons.

The cuts allowing the evacuation of water are usually essentially wide cuts called grooves. A groove has a width such that the facing walls of material that delimit the groove do not come into contact with one another when the tread enters the contact patch, when the tire is subjected to recommended inflation and load conditions as are defined in particular by the European standards of the "European Tire and Rim Technical Organization" or "E.T.R.T.O." in its "Standards Manual 2020-Commercial Vehicle Tires". The deformations in compression and in shear of the raised elements delimiting the groove govern the pressures in the contact patch, and therefore the wear. In addition, these deformations, by generating hysteresis losses in the material of the tread, impact the rolling resistance, and therefore the fuel consumption of the vehicle.

A tread may also comprise narrow cuts or sipes. A sipe has a width such that the facing walls of material that delimit the sipe come into contact with one another at least partially when the tread enters the contact patch, under the tire load and pressure conditions specified by the E.T.R.T.O as defined above. A sipe is not able to evacuate the water, but, with respect to the grip, has an edge corner effect in the contact patch, which makes it possible in particular to break a film of water that may be present on the ground.

The counterpart to the presence of cuts in a tread is that they reduce the volume of material that can be worn away. In order to limit the reduction in the volume of tread material that can be worn away resulting from the presence of grooves and sipes, so-called complex cuts have been proposed which make it possible, with respect to conventional grooves, which open entirely onto the tread surface, to increase the volume of tread material while respecting the volume of cuts for water storage beyond a predetermined threshold, whatever the level of wear of the tire.

Treads comprising such complex cuts have been described in particular in documents WO2011039194A1, WO2011101495A1, WO2012130735A1, WO2016188956A1, WO2017174925A1, WO2019008276A1 and WO2019122677A1. A complex cut opens onto the tread surface in a generally discontinuous manner, at regular or irregular intervals, when new. A complex cut thus has external cavities, which open onto the tread surface and are separated from one another in the main direction of the complex cut. The main direction of the complex cut is usually but not necessarily the direction in which water flows in said complex cut when running on ground covered in water. In addition to the external cavities, this complex cut comprises internal cavities formed inside the tread which do not open directly onto the tread surface when new and which are generally connected to the tread surface by sipes. These internal cavities are positioned radially and entirely on the inside of the tread surface in the new state, and are interposed between the external cavities. The internal cavities may be positioned at different depth levels within the thickness of the tread. Furthermore, the external cavities and the internal cavities of the one same complex cut are interconnected in such a way that the continuity of the flow of water in each complex cut is ensured in any state of wear of the tread, as in the case of a conventional continuous groove. On the other hand, the juxtaposition of internal and external cavities that are not connected to one another, and therefore do not allow fluid to flow from one to the other, does not constitute a continuous groove and is therefore not considered to be a complex cut.

The volume of all the internal cavities and external cavities present in a tread with complex cuts is generally less than that of all the grooves present in a conventional tread that open entirely onto the tread surface when new and have a depth corresponding to the maximum depth of the internal or external cavities, which means that, for a complex cut, there is a greater volume of material that can be worn away. Such a tread comprising complex cuts is consequently more rigid than an equivalent tread comprising conventional open grooves.

A tread may comprise both complex cuts, opening onto the tread surface intermittently, and conventional grooves, opening onto the tread surface over their entire length.

It is known that any tread comprising cuts generates running noise as a result of the vibration of the air in the cuts as the tread enters the contact patch in contact with the ground. The vibration of the air is the source of resonance that generates the running noise. This phenomenon is particularly notable in a tread comprising complex circumferential cuts.

From a Standards standpoint, a heavy-duty vehicle tire is classified, in terms of its running noise, for example in accordance with UNECE (United Nations Economic Commission for Europe) Regulation No 117. Reducing the running noise of a tire is therefore a current ongoing concern of tire manufacturers.

SUMMARY OF THE INVENTION

The inventors have therefore set themselves the objective of reducing the running noise of the tread of a heavy-duty vehicle tire comprising evolving complex circumferential cuts, each made up of an alternation of external cavities and of internal cavities, without impairing the ability of the tread to resist uneven wear or its robustness against attack.

This objective has been achieved by means of a tire for a heavy-duty vehicle, comprising a tread, intended to come into contact with the ground via a tread surface, and comprising at least two juxtaposed complex circumferential cuts which, with a circumferential direction of the tire, form a mean angle at most equal to 30°, and which are separated from one another by a single circumferential row of raised elements, each complex circumferential cut comprising an alternation of external cavities, which open onto the tread surface and are distributed at a circumferential pitch, and of internal cavities, which are hidden inside the tread when the tread is new, two consecutive respectively external cavities and internal cavities being connected to one another, each circumferential row of raised elements, which is delimited by two juxtaposed complex circumferential cuts, comprising raised elements, pairs of which are separated by sipes, distributed at a circumferential pitch and each having two ends opening into an external cavity of each of the two juxtaposed complex circumferential cuts, the circumferential distance between the respective two ends of any sipe in each circumferential row of raised elements being equal to the circumferential pitch of the sipes, and the circumferential pitch of the external cavities of each of the two juxtaposed complex circumferential cuts being equal to the circumferential pitch of the sipes.

A first essential feature of the invention is that the circumferential distance between the two respective ends of any sipe in each circumferential row of raised elements, delimited by two juxtaposed complex circumferential cuts, is equal to the circumferential pitch of the sipes, which is to say to the distance between two parallel consecutive sipes as measured in the circumferential direction of the tire.

This condition means that when the tire is running in the circumferential direction, for a given circumferential row of raised elements, when one end of one sipe leaves the contact patch, one end of the next sipe enters the contact patch. As a result, the end of a given sipe leaving the contact patch is axially aligned with the end of the next sipe entering the contact patch. In other words, any axial straight line on the tread surface intersects either a single sipe, or the respectively exiting and entering ends of two consecutive sipes. This configuration makes it possible to reduce the running noise of the tire.

A second essential feature of the invention is that the circumferential pitch of the external cavities of each of the two juxtaposed complex circumferential cuts is equal to the circumferential pitch of the sipes.

This condition means that any sipe in a given circumferential row of raised elements, delimited by two juxtaposed complex circumferential cuts, opens at each of its ends into an external cavity forming, with the outline of said cavity, a constant angle of incidence. The magnitude of this angle of incidence governs the robustness of the sipe end zone with respect to attack. As a result, having the same angle of incidence at each end of a sipe ensures the same level of robustness to attack over the entire circumference of the tire.

As a preference, the external cavities, belonging respectively to two juxtaposed complex circumferential cuts and connected by a sipe, are offset, from one complex circumferential cut to the other and in the circumferential direction of the tire, by a circumferential offset equal to 0.5 times the circumferential pitch of the external cavities.

A circumferential offset, between the external cavities of two juxtaposed complex cuts, that is equal to half the circumferential pitch of the external cavities, measured between the respective centres of said external cavities, makes it possible to limit the variation in axial width of the circumferential row of raised elements which is delimited by said two juxtaposed complex cuts, and therefore the variation in volume of material of said circumferential row, in the circumferential direction, as the wheel rotates. This makes it possible to limit the variation in the transverse level of siping, in the circumferential direction, this being something that is beneficial to acoustic performance. By definition, the transverse or axial level of siping, measured in a given axial plane passing through the axis of rotation of the tire, is defined as being the ratio of the sum of the axial cross sections of the cuts to the total cross section of the tread assumed to be free of cuts. In addition, a circumferential offset such as this ensures satisfactory uniformity of the tire and good resistance to the onset of uneven patterns of wear.

Advantageously, the circumferential pitch of the external cavities is constant.

Having a constant circumferential pitch for the external cavities is advantageous, from a manufacturing standpoint, because it makes it possible to simplify the manufacture of the mould in which the tire is cured, which mould can then be made up of a collection of identical elementary patterns all of the same circumferential width. However, a variable circumferential pitch for the external cavities, involving a collection of elementary patterns of varying circumferential width, offers an advantage in terms of acoustic performance because it makes it possible to improve the subjective perception of noise by a user, especially inside the vehicle.

As a preference, any sipe forms, with the straight line passing through one of its ends and tangential to the corresponding external cavity, an angle at least equal to 70°.

Such an angle of inclination of the sipe at each of its ends opening into an external cavity makes it possible to avoid any sharp points of material at said sipe end, thereby making this zone of the tread pattern more robust with respect to attack and less susceptible to chunking.

Advantageously, any sipe has a thickness, measured on the tread surface, at least equal to 0.1 mm. During manufacture, this minimum thickness ensures the robustness of the mould elements, referred to as sipe blades, intended for moulding said sipes.

More advantageously still, any sipe has a thickness, measured on the tread surface, at most equal to 1 mm. Upward of that value the sipe is no longer as effective in its function of blocking mutually-facing raised elements, said blocking being necessary for optimizing wear and rolling resistance.

Advantageously also, with any complex circumferential cut having a depth, measured in a radial direction of the tire, any sipe has a depth, measured in the radial direction of the tire, at least equal to 0.5 times the depth of the complex circumferential cut.

This minimum threshold for sipe depth ensures lasting grip of the tread on wet or snowy ground through a sipe edge-corner effect that is maintained throughout the wearing life of the tread. In addition, from a Standards standpoint, a tire designated as being a "traction" tire is required, for example in accordance with the E.T.R.T.O Standard, to have a minimum sipe depth.

Advantageously also, with any complex circumferential cut having a depth, measured in a radial direction of the tire, any sipe has a depth, measured in the radial direction of the tire, at most equal to the depth of the complex circumferential cut. Wet grip or snow grip is thus guaranteed until such point as the complex circumferential cut has fully worn down.

According to one particular and advantageous embodiment, any complex circumferential cut is delimited by two undulating radial walls with periodic undulations of which the period is equal to the circumferential pitch of the external cavities.

According to another particular and advantageous embodiment, the tread comprises four juxtaposed complex circumferential cuts and three intermediate circumferential rows of raised elements.

BRIEF DESCRIPTION OF THE DRAWINGS

The features of the invention are illustrated by the schematic FIGS. 1 to 4, which are not drawn to scale.

DETAILED DESCRIPTION OF THE DRAWINGS

Figure 1:
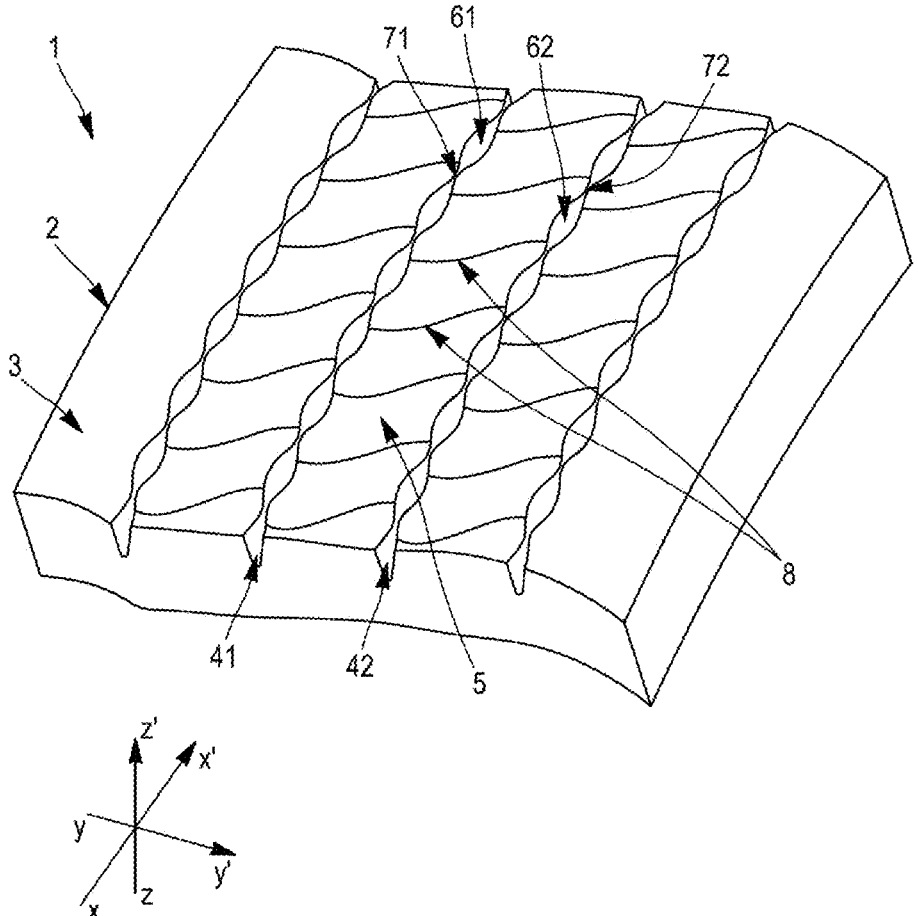
FIG. 1: A perspective view of a tread of a tire according to one preferred embodiment of the invention.

FIG. 1 is a perspective view of a tread 2 of a tire 1 according to one preferred embodiment of the invention, depicted in a cylindrical frame of reference defined by a circumferential direction XX', corresponding to the direction of rotation of the tire, an axial direction YY', parallel to the axis of rotation of the tire, and a radial direction ZZ', perpendicular to the axis of rotation of the tire. The tire 1 for a heavy-duty vehicle comprises a tread 2 intended to come into contact with the ground via a tread surface 3, and comprising, in the embodiment depicted, four juxtaposed complex circumferential cuts (41, 42) and three intermediate circumferential rows of raised elements 5. The complex circumferential cuts (41, 42) form, with the circumferential direction XX' of the tire, a mean angle equal to 0°, and pairs of them are separated from one another by a single circumferential row of raised elements 5. Each complex circumferential cut (41, 42) is made up of an alternation of external cavities (61, 62), which open onto the tread surface 3 and are distributed at a circumferential pitch, and of internal cavities (71, 72), which are hidden inside the tread 2 when the tread is new, two consecutive respectively external cavities (61, 62) and internal cavities (71, 72) being connected to one another. Each circumferential row of raised elements 5, which is delimited by two juxtaposed complex circumferential cuts (41, 42), is made up of raised elements 5, pairs of which are separated by sipes 8, distributed at a circumferential pitch and each having two ends opening into an external cavity (61, 62) of each of the two juxtaposed complex circumferential cuts (41, 42).

Figure 2:
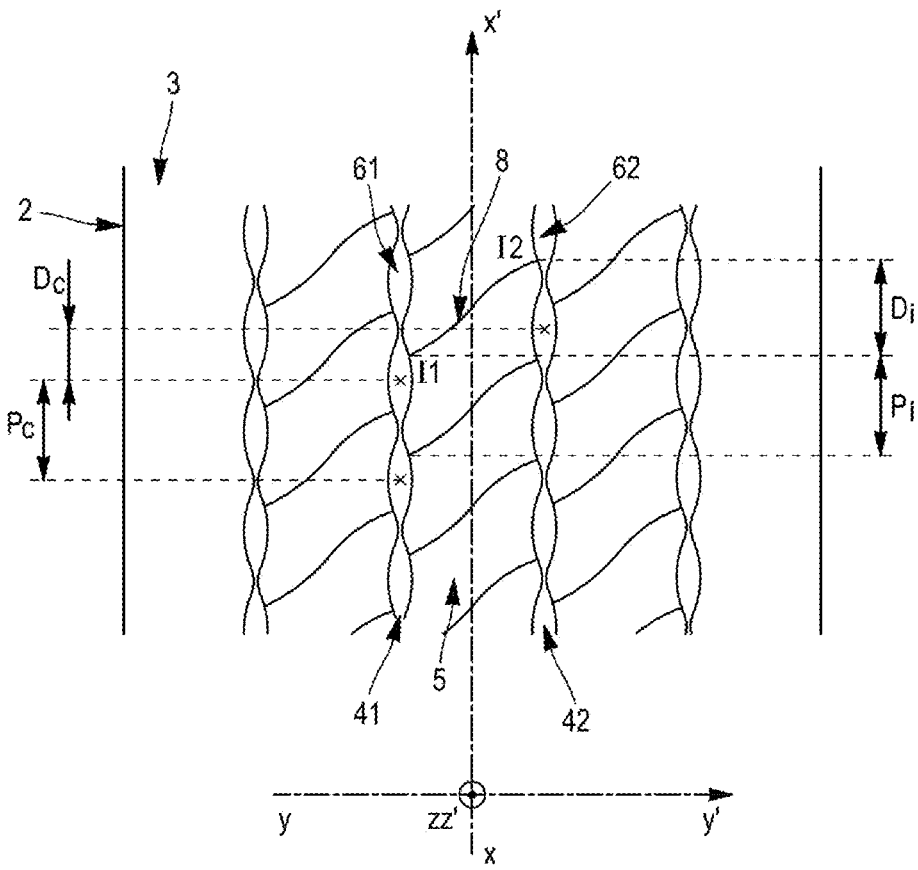
FIG. 2: A plan view, from above, of a tread of a tire according to one preferred embodiment of the invention.

FIG. 2 is a plan view, from above, of a tread of a tire according to one preferred embodiment of the invention. Each complex circumferential cut (41, 42) is made up of an alternation of external cavities (61, 62), which open onto the tread surface 3 and are distributed at a circumferential pitch Pc, and of internal cavities (71, 72), which are hidden inside the tread 2 when the tread is new, two consecutive respectively external cavities (61, 62) and internal cavities (71, 72) being connected to one another. In the embodiment depicted, any complex circumferential cut (41, 42) is delimited by two undulating radial walls with periodic undulations of which the period is equal to the circumferential pitch Pc of the external cavities (61, 62). Each circumferential row of raised elements 5, which is delimited by two juxtaposed complex circumferential cuts (41, 42), is made up of raised elements 5, pairs of which are separated by sipes 8, distributed at a circumferential pitch Pi and each having two ends (I1, I2) opening into an external cavity (61, 62) of each of the two juxtaposed complex circumferential cuts (41, 42). According to the invention, the circumferential distance Di between the respective two ends (I1, I2) of any sipe 8 in the circumferential row of raised elements 5 is equal to the circumferential pitch Pi of the sipes 8, and the circumferential pitch Pc of the external cavities (61, 62) of each of the two juxtaposed complex circumferential cuts (41, 42) is equal to the circumferential pitch Pi of the sipes 8. For a given circumferential row of raised elements 5, the end of a given sipe 8 is axially aligned with the end of the next sipe 8. The external cavities (61, 62), belonging respectively to two juxtaposed complex circumferential cuts (41, 42) and connected by a sipe 8, are offset, from one complex circumferential cut to the other and in the circumferential direction XX' of the tire, by a circumferential offset Dc equal to 0.5 times the circumferential pitch Pc of the external cavities (61, 62). The circumferential offset Dc is measured between the respective centres of said external cavities (61, 62). In addition, the circumferential pitch Pc of the external cavities (61, 62) is constant.

Figure 3:
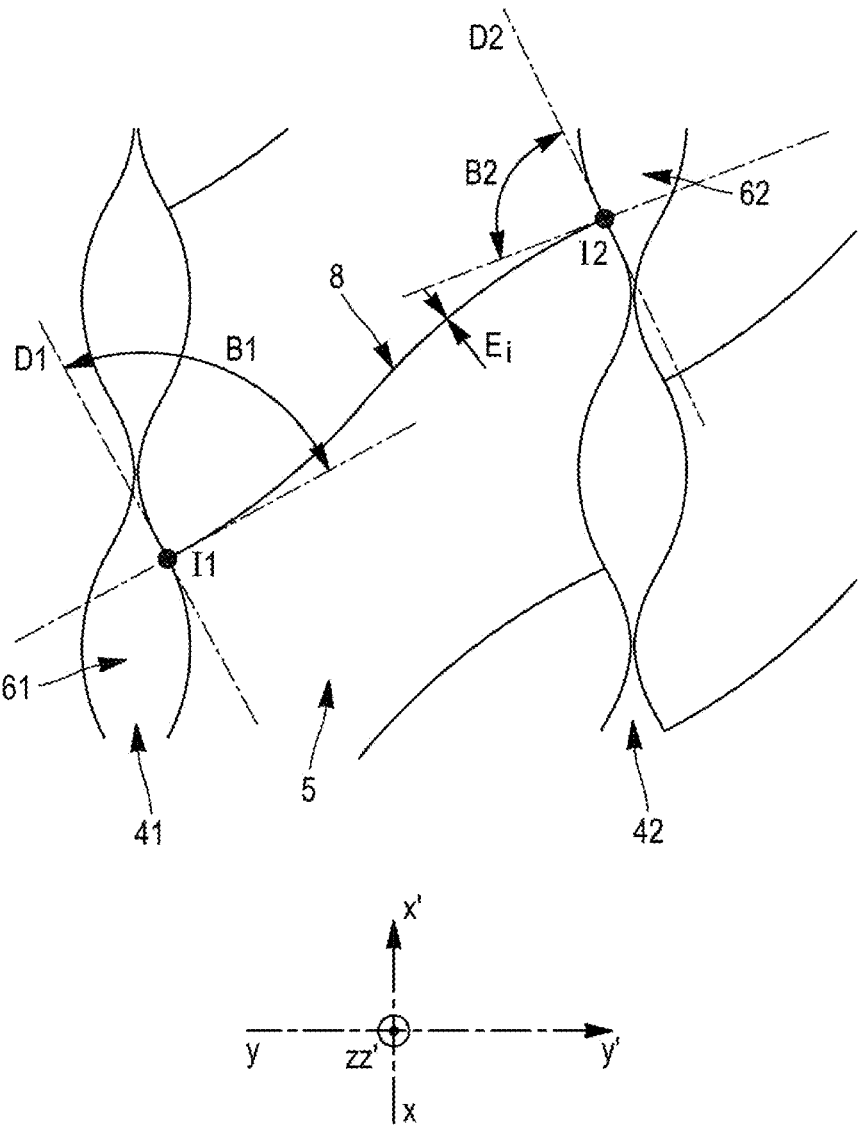
FIG. 3: A detailed plan view, from above, of a tread of a tire according to one preferred embodiment of the invention.

FIG. 3 is a detailed plan view, from above, of a tread of a tire according to one preferred embodiment of the invention. This figure in particular depicts a sipe 8, having a thickness Ei and separating two consecutive elements of a row of raised elements 5. The sipe 8 has two ends (I1, I2) opening into an external cavity (61, 62) of each of the two juxtaposed complex circumferential cuts (41, 42) and forms, with the straight line (D1, D2) passing through one of its ends (I1, I2) and tangential to the corresponding external cavity (61, 62), an angle (B1, B2) at least equal to 70°. Such an angle (B1, B2) of the sipe 8 at each of its ends (I1, I2) opening into an external cavity (61, 62) makes it possible to avoid any sharp points of material at said sipe end, thereby making this zone of the tread pattern more robust with respect to attack.

Figure 4:
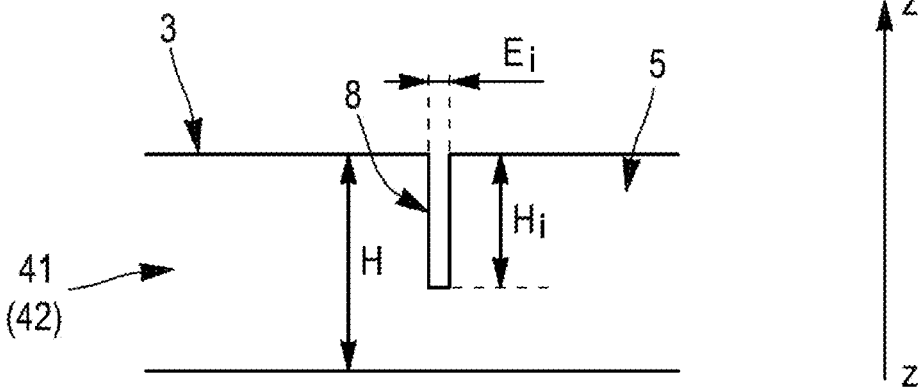
FIG. 4: A view in cross section, in a radial direction, of a sipe opening into a complex cut of a tread of a tire according to one preferred embodiment of the invention.

FIG. 4 is a view in cross section, in a radial direction ZZ', of a sipe 8 opening into a complex cut (41, 42) of a tread of a tire according to one preferred embodiment of the invention. Advantageously, the sipe 8 has a thickness Ei, measured on the tread surface 3, at least equal to 0.1 mm, and at most equal to 1 mm. With a complex circumferential cut (41, 42) having a depth H, measured in a radial direction ZZ' of the tire, the sipe 8 advantageously has a depth Hi, measured in the radial direction ZZ' of the tire, that is at least equal to 0.5 times the depth H of the complex circumferential cut (41, 42), and at most equal to the depth H of the complex circumferential cut (41, 42).

The inventors have more particularly studied this invention for a tire of dimension 275/70 R22.5, intended to be fitted to all the axles of a city bus and having a load capacity of 3550 kg for an inflation pressure equal to 9 bar.

Table 1 below compares the characteristics of a tire I according to the invention:

TABLE 1

| Characteristics | I | Comments |
|---|---|---|
| Mean angle of complex circumferential cuts (61, 62) with respect to the circumferential direction XX' | 0° | Complex cuts are strictly circumferential |
| Circumferential distance Di between the ends (I1, I2) of a sipe 8 | 31.6 mm | Di = Pc |
| Circumferential pitch Pc of the external cavities (61, 62) | 31.6 mm | |
| Circumferential pitch Pi of the sipes 8 | 31.6 mm | Pi = Pc |
| Circumferential distance Dc between the respective external cavities (61, 62) of 2 juxtaposed complex circumferential cuts (41, 42) | 15.8 mm | Dc = 0.5*Pc |
| Angle of the sipes 8 at their ends, with respect to the circumferential direction XX' | 50° with respect to XX' | Angle determined with respect to the circumferential direction XX', and not with respect to the tangent to the external cavity into which the sipe opens |
| Thickness Ei of sipe | 0.4 mm | Comprised in the range [0.1 mm; 1 mm] |
| Depth Hi of sipe 8 | 17.3 mm | Equal to the depth H of the complex circumferential cut: 0.5 mm |

A running-noise test, in accordance with UNECE Regulation No 117, demonstrated a noise level equal to 71 dB for a tire of size 275/70 R22.5 according to the invention.

The invention is applicable more generally to any tire intended to be fitted in particular to any type, steering, driven or load-bearing, of axle of a heavy-duty vehicle for road use.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire for a heavy-duty vehicle, comprising a tread, intended to come into contact with the ground via a tread surface, and comprising at least two juxtaposed complex circumferential cuts which, with a circumferential direction (XX') of the tire, form a mean angle at most equal to 30°, and which are separated from one another by a single circumferential row of raised elements, each complex circumferential cut comprising an alternation of external cavities, which open onto the tread surface and are distributed at a circumferential pitch (Pc), and of internal cavities, which are hidden inside the tread when the tread is new, two consecutive respectively external cavities and internal cavities being connected to one another, each circumferential row of raised elements, which is delimited by two juxtaposed complex circumferential cuts, comprising raised elements, pairs of which are separated by sipes, distributed at a circumferential pitch (Pi) and each sipe having two ends (I1, I2) opening into an external cavity of each of the two juxtaposed complex circumferential cuts, wherein the circumferential distance (Di) between the respective two ends (I1, I2) of any each sipe in each circumferential row of raised elements is equal to the circumferential pitch (Pi) of the sipes (8) and wherein the circumferential pitch (Pc) of the external cavities of each of the two juxtaposed complex circumferential cuts is equal to the circumferential pitch (Pi) of the sipes.

2. The tire according to claim 1, wherein the circumferential pitch (Pc) of the external cavities is constant.

3. The tire according to claim 1, wherein any sipe forms, with the straight line (D1, D2) passing through one of its ends (I1, I2) and tangential to the corresponding external cavity, an angle (B1, B2) at least equal to 70°.

4. The tire according to claim 1, wherein any sipe has a thickness (Ei), measured on the tread surface, at least equal to 0.1 mm.

5. The tire according to claim 1, wherein any complex circumferential cut has a depth (H), measured in a radial direction (ZZ') of the tire, and wherein any sipe has a depth (Hi), measured in the radial direction (ZZ') of the tire, at least equal to 0.5 times the depth (H) of the complex circumferential cut.

6. The tire according to claim 1, wherein any complex circumferential cut has a depth (H), measured in a radial direction (ZZ') of the tire, and wherein any sipe has a depth (Hi), measured in the radial direction (ZZ') of the tire, at most equal to the depth (H) of the complex circumferential cut.

7. The tire according to claim 1, wherein any complex circumferential cut is delimited by two undulating radial walls with periodic undulations of which the period is equal to the circumferential pitch (Pc) of the external cavities.

8. The tire according to claim 1, wherein the tread comprises four juxtaposed complex circumferential cuts and three intermediate circumferential rows of raised elements.

9. The tire according to claim 1, wherein the external cavities, belonging respectively to two juxtaposed complex circumferential cuts and connected by a sipe, are offset, from one complex circumferential cut to the other and in the circumferential direction (XX') of the tire, by a circumferential offset (Dc) equal to 0.5 times the circumferential pitch (Pc) of the external cavities.

10. The tire according to claim 9, wherein any sipe has a thickness (Ei), measured on the tread surface, at most equal to 1 mm.

* * * * *